(12) United States Patent
Choi et al.

(10) Patent No.: US 10,992,626 B2
(45) Date of Patent: Apr. 27, 2021

(54) METHOD OF PROVIDING INSTANT MESSAGING SERVICE FOR SECRET MESSAGE AND USER DEVICE FOR PERFORMING THE METHOD

(71) Applicant: KAKAO CORP., Jeju-si (KR)

(72) Inventors: So Young Choi, Seoul (KR); Bo Mi Kim, Seoul (KR); Un Bong Kang, Yongin-si (KR); Jung Ho Song, Gwangju-si (KR); Ji Na Kim, Seongnam-si (KR); Jun Hyuk Jang, Seongnam-si (KR); Ji Won Suh, Seoul (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 15/853,959

(22) Filed: Dec. 26, 2017

(65) Prior Publication Data

US 2018/0183743 A1 Jun. 28, 2018

(30) Foreign Application Priority Data

Dec. 27, 2016 (KR) .......................... 10-2016-0180261

(51) Int. Cl.
*H04L 12/58* (2006.01)

(52) U.S. Cl.
CPC .............. *H04L 51/18* (2013.01); *H04L 51/04* (2013.01); *H04L 51/046* (2013.01); *H04L 51/16* (2013.01); *H04L 51/22* (2013.01)

(58) Field of Classification Search
CPC ....... H04L 51/18; H04L 51/04; H04L 51/046; H04L 51/16; H04L 51/22
See application file for complete search history.

(56) References Cited

U.S. PATENT DOCUMENTS

| 2006/0036740 | A1* | 2/2006 | Hagale | G06Q 10/107 709/227 |
| 2007/0033259 | A1 | 2/2007 | Wies et al. | |
| 2009/0005089 | A1* | 1/2009 | Paik | H04L 51/04 455/466 |
| 2013/0337854 | A1* | 12/2013 | Rogitz | H04W 4/14 455/466 |
| 2014/0047358 | A1* | 2/2014 | Park | H04L 51/04 715/758 |

(Continued)

FOREIGN PATENT DOCUMENTS

| CN | 1655538 A | 8/2005 |
| CN | 101179524 A | 5/2008 |

(Continued)

OTHER PUBLICATIONS

Chinese Office Action for Application No. 201711433935.9 dated Apr. 15, 2020.

*Primary Examiner* — Christopher B Robinson
(74) *Attorney, Agent, or Firm* — Cantor Colburn LLP (57) ABSTRACT

An instant messaging service providing method and a user terminal for performing the instant messaging service providing method including receiving and displaying a first message that is created by a message transmitter; determining whether a message switching condition is met after the first message is displayed; and displaying a second message that is created by the message transmitter when the message switching condition is determined to be met.

9 Claims, 7 Drawing Sheets

(56) References Cited

U.S. PATENT DOCUMENTS

| | | | |
|---|---|---|---|
| 2014/0181215 A1* | 6/2014 | Omoko | H04L 51/046 709/206 |
| 2014/0298197 A1 | 10/2014 | Kwon | |
| 2015/0121256 A1* | 4/2015 | Kim | G06Q 10/10 715/758 |
| 2015/0177974 A1* | 6/2015 | Lu | H04L 51/04 715/752 |
| 2016/0191442 A1* | 6/2016 | Penilla | H04L 51/22 709/206 |
| 2016/0259526 A1 | 9/2016 | Lee et al. | |
| 2016/0277329 A1* | 9/2016 | Gordon | H04L 51/046 |

FOREIGN PATENT DOCUMENTS

| | | |
|---|---|---|
| CN | 103577042 A | 2/2014 |
| CN | 104102425 A | 10/2014 |
| CN | 104601451 A | 5/2015 |
| JP | 2004503004 A | 1/2004 |
| JP | 2004206544 A | 7/2004 |
| JP | 2016164782 A | 9/2016 |
| KR | 1020150021789 A | 3/2015 |
| KR | 101532908 B1 | 7/2015 |
| KR | 1020150107240 A | 9/2015 |

\* cited by examiner

<Case 1>

FIG. 2B

<Case 2>

FIG. 4A

METHOD OF PROVIDING INSTANT MESSAGING SERVICE FOR SECRET MESSAGE AND USER DEVICE FOR PERFORMING THE METHOD

CROSS-REFERENCE TO RELATED APPLICATION(S)

This application claims the priority benefit of Korean Patent Application No. 10-2016-0180261 filed on Dec. 27, 2016, in the Korean Intellectual Property Office, the disclosure of which is incorporated herein by reference for all purposes.

BACKGROUND

1. Field

One or more example embodiments relate to an instant messaging service providing method and a user terminal for performing the method, and more particularly, and an instant messaging service providing method that may switch a general message to a secret message and may provide the switched secret message.

2. Description of Related Art

In general, a current instant messaging service providing method provides a form in which chat messages are transmitted and received between a message sender and a message recipient. However, while chatting in a chatroom, a user may need to convey a secret, such as an unimportant, careful, or frank mind.

An instant messaging service providing method according to a related art may simply create and transmit a message that represents a secret. To provide such a function, a secret chat function may be provided. However, even the secret chat function may directly express the secret.

SUMMARY

At least one example embodiment provides a method and an apparatus that may further easily express a secret of a message sender by, if a message expressed in a general form meets a specific condition, switching the message expressed in the general form to a message including the secret that the message sender desires to express and by displaying the switched message.

At least one example embodiment also provides a method and apparatus that may give a fun in using an instant messaging service by providing a message switching function so that contents of a message may be inverted.

According to an aspect of at least one example embodiment, there is provided an instant messaging service providing method performed by a user terminal, the method including receiving and displaying a first message that is created by a message transmitter; determining whether a message switching condition is met after the first message is displayed; and displaying a second message that is created by the message transmitter when the message switching condition is determined to be met.

The determining may include determining that the message switching condition is met when the first message is selected by a message recipient, when a desired period is elapsed after the first message is displayed, or when a desired event is performed after the first message is displayed.

The first message and the second message may be distinguished from each other based on an identification character and may be created on the same message input box, or may be created on different message input boxes, respectively.

The displaying may include displaying the second message by rotating or replacing a speech balloon on which the first message is displayed, or displaying the second message through a separate interface of overlapping a chat window on which the first message is displayed.

According to an aspect of at least one example embodiment, there is provided an instant messaging service providing method performed by a user terminal, the method including displaying a message input box through a message application of a message sender; identifying a first message and a second message input through the message input box; and transmitting the first message and the second message to a message server. The second message is displayed when a message switching condition is met after the first message is transferred to a message recipient and displayed.

The message switching condition may include a case in which the first message is selected by the message recipient, a case in which a desired period is elapsed after the first message is displayed, or a case in which a desired event is performed after the first message is displayed.

The first message and the second message may be distinguished from each other based on an identification character and may be created on the same message input box, or may be created on different message input boxes, respectively.

The second message may be displayed by rotating or replacing a speech balloon on which the first message is displayed, or displayed through a separate interface of overlapping a chat window on which the first message is displayed.

According to an aspect of at least one example embodiment, there is provided a user terminal including a processor. The processor is configured to receive and display a first message that is created by a message transmitter, to determine whether a message switching condition is met after the first message is displayed, and to display a second message that is created by the message transmitter when the message switching condition is determined to be met.

According to an aspect of at least one example embodiment, there is provided a user terminal including a processor. The processor is configured to display a message input box through a message application of a message sender, to identify a first message and a second message input through the message input box, and to transmit the first message and the second message to a message server, and the second message is displayed when a message switching condition is met after the first message is transferred to a message recipient and displayed. According to example embodiments, it is possible to further easily express a secret of a message sender by, if a message expressed in a general form meets a specific condition, switching the message expressed in the general form to a message including the secret that the message sender desires to express and by displaying the switched message.

According to example embodiments, it is possible to give a fun in using an instant messaging service by providing a message switching function so that contents of a message may be inverted.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, example embodiments are described with reference to the accompanying drawings.

Figure 1:
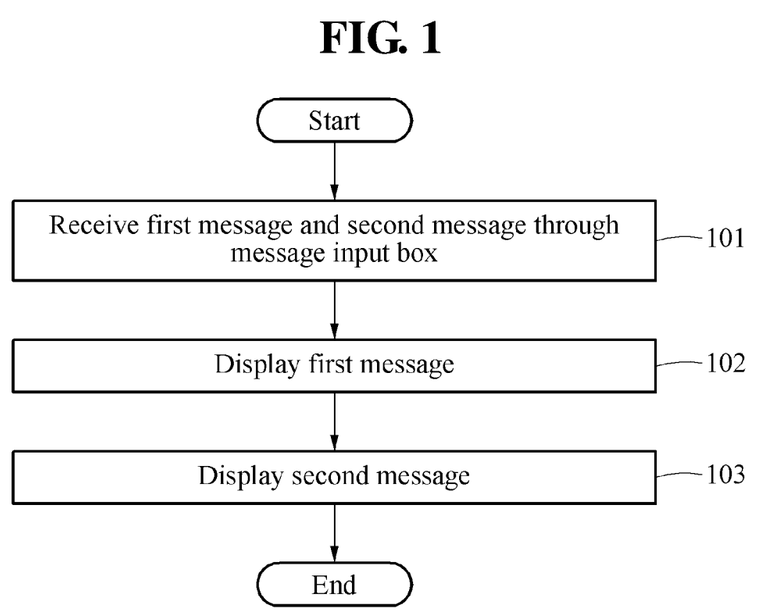
FIG. 1 is a flowchart illustrating an instant messaging service providing method according to an example embodiment.

FIG. 1 is a flowchart illustrating an instant messaging service providing method according to an example embodiment.

The instant messaging service providing method may be performed through a processor of a user terminal. The example embodiments may be applied when a one-to-one chat is performed between a user and a counterpart in a chatroom or when a group chat is performed in a group that includes a plurality of chat participants.

In operation 101, the processor may receive a first message and a second message through a message input box. Each of the first message and the second message may refer to a message that is created by a message sender on a message input box. Which message is initially created between the first message and the second message is irrelevant. The first message may be displayed before the second message. In detail, when a specific condition is met after the first message is initially displayed on a chat window, the second message may be displayed on the chat window.

Figure 2A:
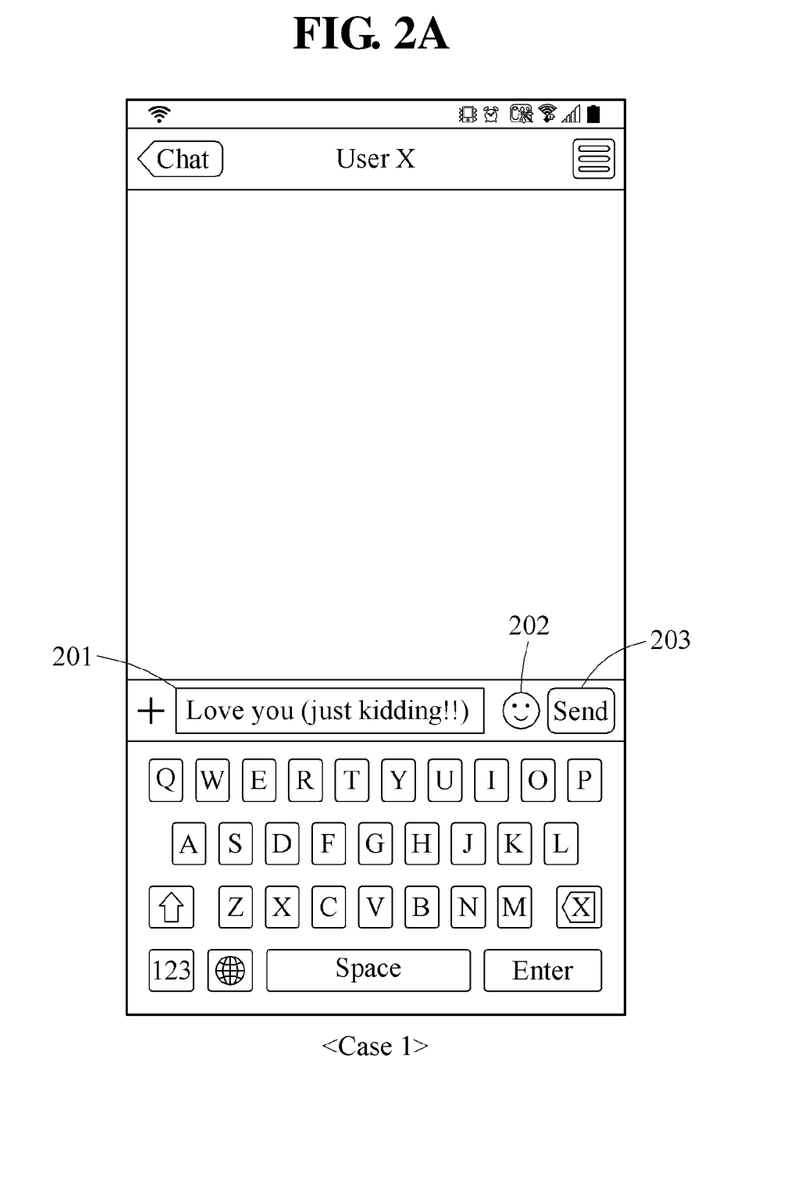
FIGS. 2A and 2B illustrate examples of a message input scheme according to an example embodiment.
Figure 2B:
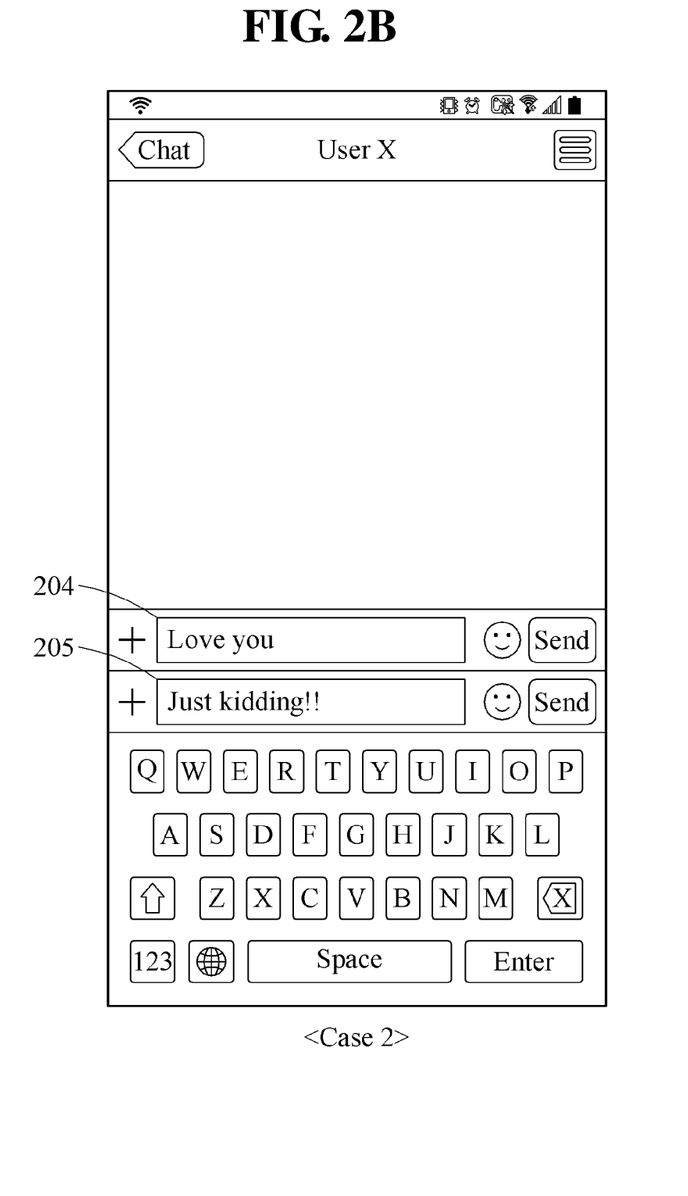

Here, the first message may refer to a general message that the message sender desires to transmit to a message recipient and the second message may refer to a message indicating an inversion for fun or indicating a secret for the message recipient. That is, when the first message is received and then switched to the second message different from the first message, the message recipient may experience a fun or an inversion or may verify the secret of the message sender. A method of creating the first message and the second message using the message input box is further described with reference to FIG. 2.

In operation 102, the processor may display the first message on a chat window. The first message may be displayed on a chat window of the message sender and a chat window of the message recipient.

In operation 103, the processor may display the second message on the chat window. The second message may be displayed on the chat window of the message recipient. Here, the second message may also be displayed for the message sender. When a specific condition is met after the first message is displayed, the second message may be switched from the first message and displayed. That is, the first message may disappear on the chat window and the second message switched from the first message may be displayed on the chat window. Alternatively, with the first message being maintained to be displayed on the chat window, the second message may be displayed through a separate interface different from that of the first message.

According to an example embodiment, it is possible to provide an instant messaging service capable of satisfying the intent of conveying a meaning contained in another side of a transmission message by transmitting another message combined with the transmission message to a counterpart during chatting between users. A message switching scheme is described with reference to FIG. 3 and a message display scheme is described with reference to FIG. 4.

FIGS. 2A and 2B illustrate examples of a message input scheme according to an example embodiment.

FIGS. 2A and 2B are two cases, Case 1 and Case 2, showing a process of inputting a first message and a second message, respectively. Case 1 shows a process in which a message sender inputs the first message and the second message using the same message input box, and Case 2 shows a process in which the message sender inputs the first message and the second message using different message input boxes.

Hereinafter, Case 1 of FIG. 2A, that is, a scheme of inputting the first message and the second message using a single message input box is described.

Referring to Case 1 of FIG. 2A, a user may input the first message on a message input box 201 and may also input the second message with message identification characters on the same message input box 201 after inputting the first message. That is, on the message input box 201, the user may input "love you" that is the first message and may input the second message to brackets ( ) that are the message identification characters. Although FIG. 2A uses a bracket as a message identification character, it is provided as an example only. Special symbols, /, @, !, #, etc., and specific characters may be used for the message identification character.

Hereinafter, Case 2 of FIG. 2B, that is, a scheme of inputting the first message and the second message using different message input boxes is described.

Referring to Case 2 of FIG. 2B, the user may input the first message on a message input box 204 and may input the second message on a message input box 205 different from the message input box 204. Here, the message input boxes 204 and 205 that differ from each other may be simultaneously displayed on a chat window.

Here, Case 2 may indicate an interface when a mode of a message application is changed to a "switch mode". That is, when the message application is in a "general mode", only a single message input box 204 may be displayed. When the message application is in the "switch mode", all of the message input boxes 204 and 205 may be displayed. The mode of the message application may be changed by selecting a button associated with a mode switching on the chat window or by selecting an option of the chat window.

Dissimilar to FIGS. 2A and 2B, when a specific condition is met after the message input box 204 for inputting the first message is displayed, the message input box 205 for inputting the second message may be displayed. That is, the message input box 205 may be switched from the message input box 204 and displayed on the chat window.

For example, when the user inputs the first message on the message input box 204 and then selects a button associated with a mode switching, the message input box 204 may disappear on the chat window and the message input box 205 for inputting the second message may be displayed on the chat window.

Alternatively, when the user inputs the first message on the message input box 204 and then consecutively clicks a button 203 associated with a message transmission during a desired period, the message input box 204 may disappear on the chat window and the message input box 205 for inputting the second message may be displayed on the chat window.

Alternatively, when the user inputs the first message on the message input box 204 and then swipes a chat window screen or clicks the chat window screen during a desired period, the message input box 204 may disappear on the chat window and the message input box 205 for inputting the second message may be displayed on the chat window.

Figure 3A:
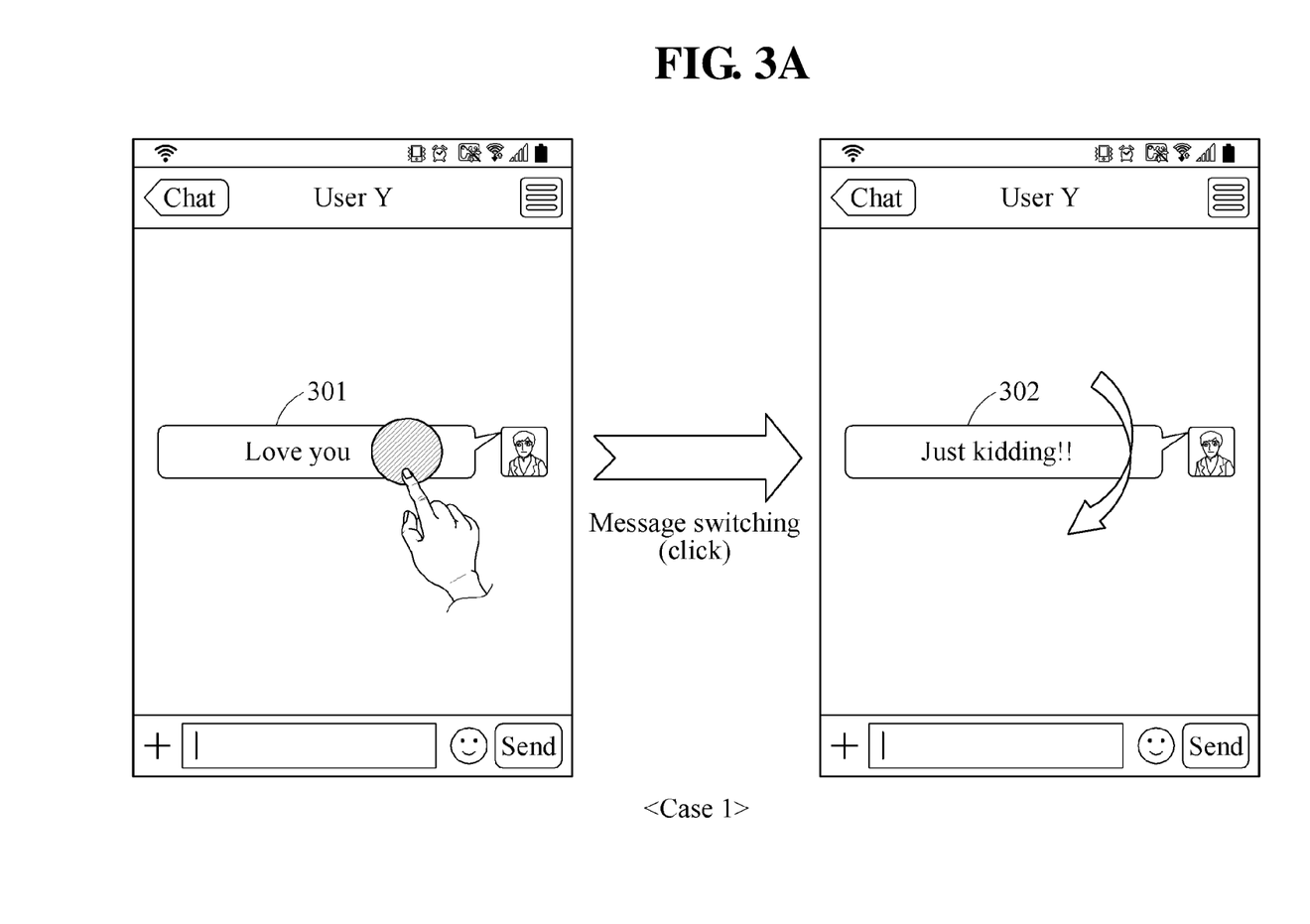
FIGS. 3A and 3B illustrate examples of a message switching scheme according to an example embodiment.
Figure 3B:
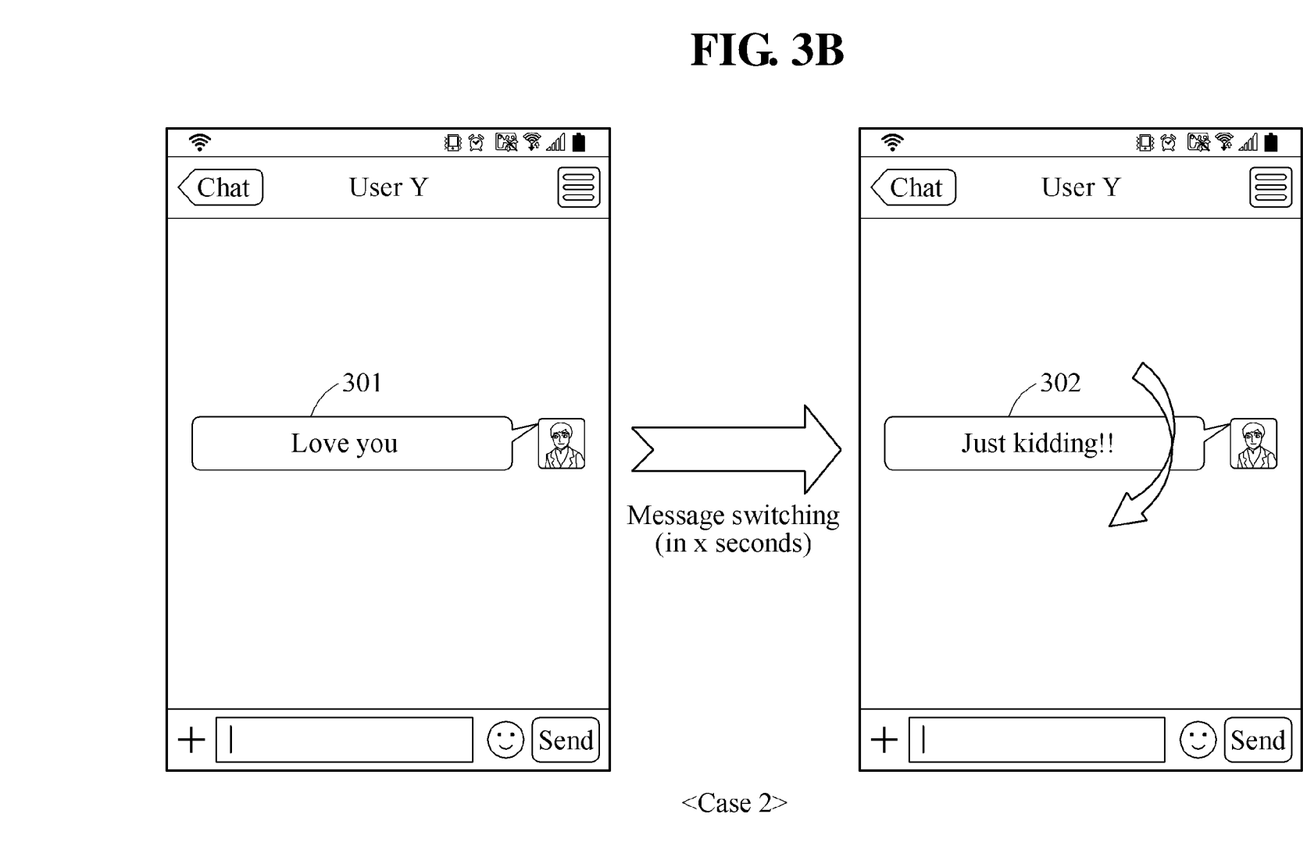

FIGS. 3A and 3B illustrate examples of a message switching scheme according to an example embodiment.

FIGS. 3A and 3B are two cases, Case 1 and Case 2, showing a process of switching a first message to a second message. Case 1 shows a process of switching the first message to the second message when a message recipient selects the first message created by a message sender after the first message is displayed on a chat window. Case 2 shows a process of switching the first message to the second message when a desired period is elapsed after the first message created by the message sender is displayed on the chat window.

According to an example embodiment, when a message switching condition is met, the first message displayed on the chat window may be switched to the second message. Here, the message switching condition may include a variety of conditions, for example, a time, a user behavior, whether to perform an event, and the like. Hereinafter, examples of the message switching condition are provided.

(i) User behavior: When the message recipient selects a first message 301 after the first message 301 is displayed on the chat window, the first message may be switched to a second message 302 (Case 1 of FIG. 3A).

Here, when the message recipient selects or drags a speech balloon including the first message 301, the first message 301 displayed on the chat window may be switched to the second message 302. In this case, a separate identifier, for example, a button, an icon, a symbol, a number, etc., indicating that the first message 301 is switchable may be displayed on the chat window on which the first message 301 is displayed. Through this, the message recipient may recognize that the first message 301 displayed on the chat window is not a general message but a special message switchable to the second message 302 representing a secret, etc.

(ii) Time: When a desired period is elapsed after the first message 301 is displayed on the chat window, the first message 301 may be switched to the second message 302 (Case 2 of FIG. 3B).

Referring to Case 2 of FIG. 3B, when a desired period, for example, x seconds, is elapsed after the first message 301 is displayed, the first message 301 may be automatically switched to the second message 302. Case 1 requires a separate behavior of the message recipient whereas Case 2 does not require the separate behavior of the message recipient. Accordingly, the message recipient having not recognized the message switching may experience a further dramatic fun or inversion.

(iii) Whether to perform an event: When a specific event is performed after the first message 301 is displayed on the chat window, the first message 301 may be switched to the second message 302.

Although not illustrated in FIGS. 3A and 3B, the following events may be performed.

For example, when the message recipient selects a message input box to input a response message to the first message 301, it may be determined that the event is performed. Alternatively, when the message recipient verifies the first message 301 and leaves the chat window, it may be determined that the event is performed.

Alternatively, when the message recipient using an application different from a message application verifies the first message 301 through a pop-up function, when the message recipient verifies the first message 301 by clicking a pop-up window, or when the message recipient enters a chatroom by executing the message application, it may be determined that the event is performed.

Alternatively, when the message recipient selects a specific key after the first message 301 is displayed on the chat window, when the message recipient selects the chat window after the first message 301 is displayed on the chat window, or when the message recipient selects another menu displayed on the chat window after the first message 301 is displayed on the chat window, it may be determined that the event is performed.

Figure 4A:
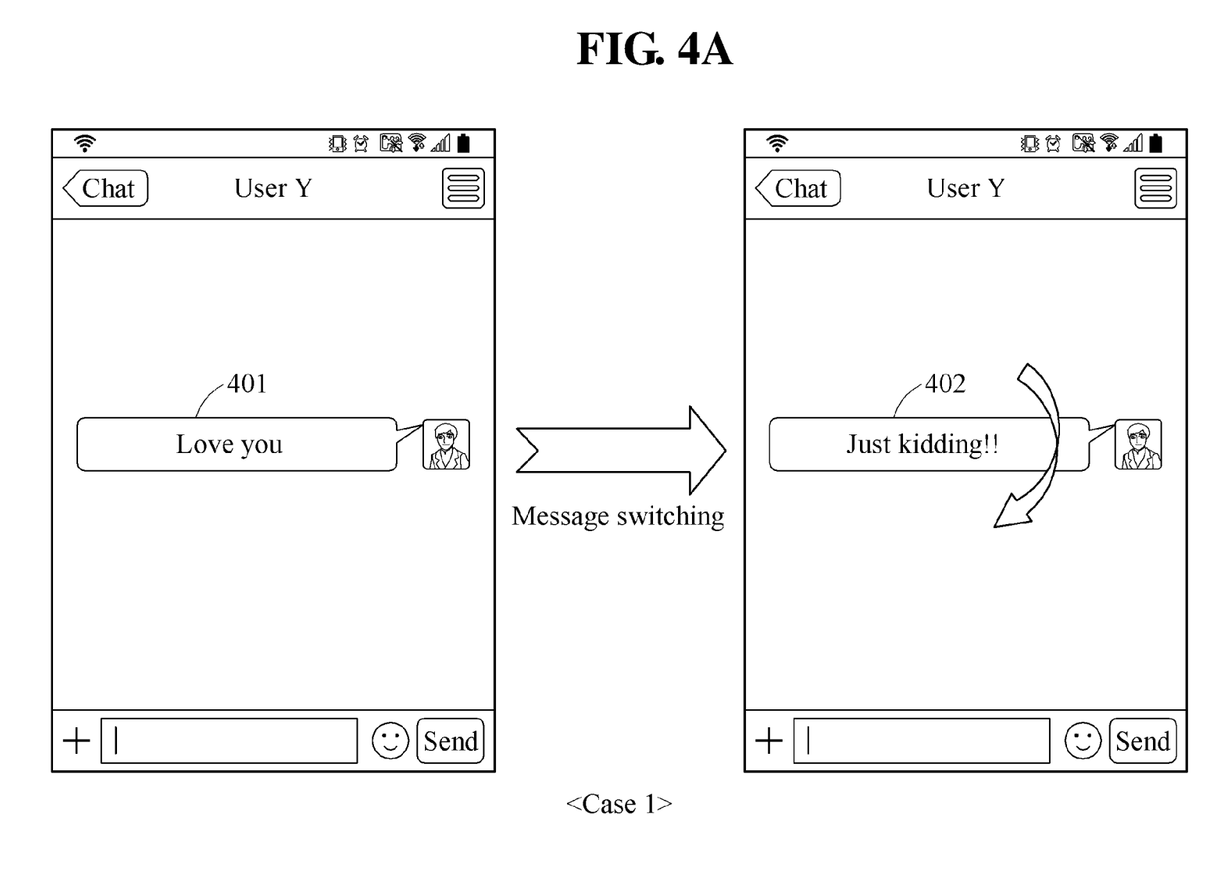
FIGS. 4A and 4B illustrate examples of a message display scheme according to an example embodiment.
Figure 4B:
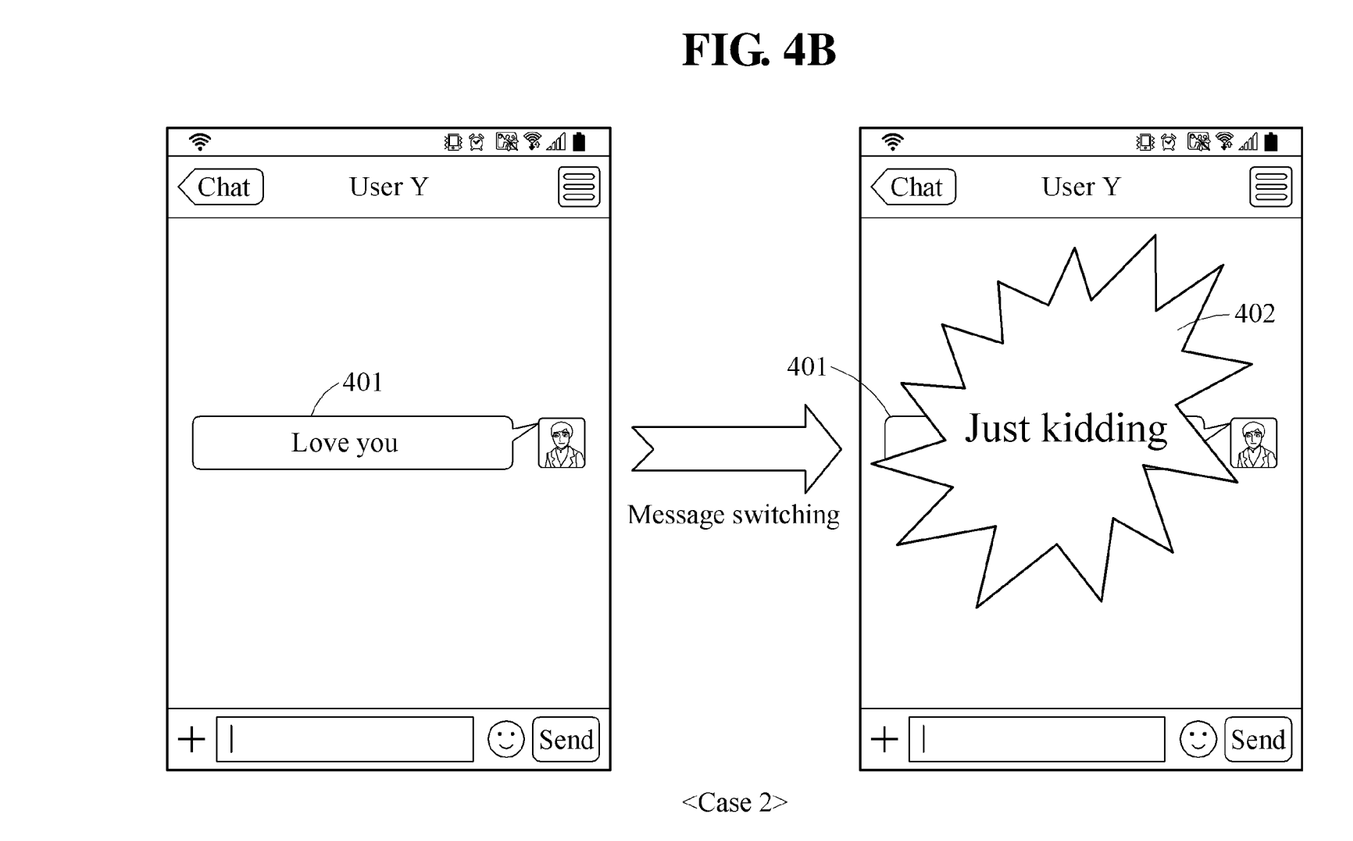

FIGS. 4A and 4B illustrate examples of a message display scheme according to an example embodiment.

Case 1 and Case 2 of FIGS. 4A and 4B show a scheme of switching and thereby displaying a message after a first message 401 is displayed on a chat window of a message recipient.

Hereinafter, Case 1 of FIG. 4A, that is, a scheme of replacing a speech balloon of the first message 401 with a speech balloon of a second message 402 is described.

Referring to Case 1 of FIG. 4A, the speech balloon on which the first message 401 is displayed may rotate and be replaced with the speech balloon of the second message 402. Here, the switching may be performed using another animation instead of rotating the first message 401. That is, the message recipient may experience the effect that a message replacement is performed on a speech balloon.

The speech balloon of the first message 401 and the speech balloon of the second message 402 may be in the same style or in different styles. When they are in different styles, a font, a color, a size, animation effect, etc., may be different between the first message 401 and the second message 402. Alternatively, the speech balloon including the first message 401 and the speech balloon including the second message 402 may have different shapes, types, shadowing, colors, sizes, etc.

Hereinafter, Case 2 of FIG. 4B, that is, a scheme of displaying the second message 402 through a separate interface after the first message 401 is displayed is described.

Referring to Case 2 of FIG. 4B, although the first message 401 is displayed on the speech balloon, the second message 402 may be displayed through another interface instead of being displayed on the speech balloon. For example, the second message 402 may be displayed through a separate interface with a size that overlaps the entire chat window or most of the chat window. Compared to Case 1, Case 2 may allow the message recipient to experience a further dramatic fun or inversion from the appearance of the second message 402.

Here, the interface may be purchased or set by the message sender or the message recipient. The interface may be changed by the message sender or the message recipient using a preview function that is provided through the chat window. The message sender may select the interface at a point in time at which each of the first message 401 and the second message 402 is created. The message recipient may select the interface at a desired point in time before the point in time at which each of the first message 401 and the second message 402 is created. The interface may be displayed with a separate sound effect.

The instant messaging service providing method according to the example embodiments may be implemented in a program executable on a computer and may be recorded in various recording media, for example, magnetic storage media, optical media, digital storage media, and the like.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An instant messaging service providing method performed by a message-receiving user terminal, the method comprising:
    displaying a first message created by a message-sending user terminal, on a chat window of the message-receiving user terminal;
    determining, by the message-receiving user terminal, whether a message switching condition is met after the first message is displayed; and
    displaying a second message created by the message-sending user terminal and different from the first message instead of the first message in a same position the first message is displayed on the chat window of the message-receiving user terminal, when the message switching condition is determined to be met,
    wherein the first message disappears on the chat window of the message-receiving user terminal, and the second message switched from the first message is displayed on the chat window, when the message switching condition is determined to be met, and
    the second message is designated as an object to be switched from the first message by the message-sending user terminal, before the first message is displayed on the chat window of the message-receiving user terminal.

2. The method of claim 1, wherein the message switching condition is met, when the message-receiving user terminal selects a message input box to input a response message to the first message, when the message-receiving user terminal verifies the first message and leaves the chat window, when the message-receiving user terminal enters a chatroom by executing a message application, when the message-receiving user terminal using an application different from the message application verifies the first message through a pop-up function, when the message-receiving user terminal selects the chat window after the first message is displayed on the chat window, or when the message-receiving user terminal selects another menu displayed on the chat window after the first message is displayed on the chat window.

3. The method of claim 1, wherein the first message and the second message are distinguished from each other based on an identification character.

4. The method of claim 1, wherein the displaying of the second message on the chat window of the message-receiving user terminal comprises displaying the second message by rotating a speech balloon or changing shadowing or a color of the speech balloon on which the first message is displayed, or displaying the second message through a separate interface overlapping the speech balloon on which the first message is displayed, or
    wherein a font, a color, a size, or an animation effect of the second message is different from a font, a color, a size, or an animation effect of the first message.

5. An instant messaging service providing method performed by a message-sending user terminal, the method comprising:
- displaying a message input box through a message application on the message-sending user terminal;
- identifying, by the message-sending user terminal, a first message and a second message input through the message input box; and
- transmitting, by the message-sending user terminal, the first message and the second message to a message server,
- wherein the second message different from the first message is displayed instead of the first message in a same position the first message is displayed on a chat window of a message-receiving user terminal, when a message switching condition is met after the first message is transferred to and displayed on the message-receiving user terminal,
- wherein the first message disappears on the chat window of the message-receiving user terminal, and the second message switched from the first message is displayed on the chat window, when the message switching condition is determined to be met, and
- wherein the message-sending user terminal designates the second message as an object to be switched from the first message, before the first message is displayed on the message-receiving user terminal.

6. The method of claim 5, wherein the message switching condition is met, when the message-receiving user terminal selects a message input box to input a response message to the first message, when the message-receiving user terminal verifies the first message and leaves the chat window, when the message-receiving user terminal enters a chatroom by executing a message application, when the message-receiving user terminal using an application different from the message application verifies the first message through a pop-up function, when the message-receiving user terminal selects the chat window after the first message is displayed on the chat window, or when the message-receiving user terminal selects another menu displayed on the chat window after the first message is displayed on the chat window.

7. The method of claim 5, wherein the first message and the second message are distinguished from each other based on an identification character.

8. The method of claim 5, wherein the second message is displayed on the chat window of the message-receiving user terminal by rotating a speech balloon or changing shadowing or a color of the speech balloon on which the first message is displayed, or displayed through a separate interface overlapping the speech balloon on which the first message is displayed, or
- wherein a font, a color, a size, or an animation effect of the second message is different from a font, a color, a size, or an animation effect of the first message.

9. A message-receiving user terminal comprising:
- a processor configured to display a first message created by a message-sending user terminal, on a chat window of the message-receiving user terminal, to determine whether a message switching condition is met after the first message is displayed, and to display a second message created by the message-sending user terminal and different from the first message instead of the first message in a same position the first message is displayed on the chat window when the message switching condition is determined to be met,
- wherein the first message disappears on the chat window, and the second message switched from the first message is displayed on the chat window, when the message switching condition is determined to be met, and
- wherein the second message is designated as an object to be switched from the first message by the message-sending user terminal, before the first message is displayed on the chat window of the message-receiving user terminal.

* * * * *